United States Patent [19]

Angwin et al.

[11] 4,295,818

[45] Oct. 20, 1981

[54] CATALYTIC MONOLITH AND METHOD OF ITS FORMULATION

[75] Inventors: Meredith J. Angwin, Palo Alto, Calif.; William C. Pfefferle, Middletown, N.J.; John P. Kesselring, Mountain View, Calif.

[73] Assignee: United States of America, Washington, D.C.

[21] Appl. No.: 153,056

[22] Filed: May 27, 1980

[51] Int. Cl.$^3$ .................... F23D 3/40; B01J 23/10; B01J 23/74; B01J 35/04
[52] U.S. Cl. .................... 431/7; 252/461; 252/462; 252/467; 252/472; 252/477 R; 428/116
[58] Field of Search ............ 252/462, 477 R, 461, 252/467, 472; 106/41; 156/89; 264/44, 59; 422/177, 180; 423/213.2, 213.5; 428/116; 431/7

[56] References Cited

U.S. PATENT DOCUMENTS

| | | | |
|---|---|---|---|
| 3,873,471 | 3/1975 | Koberstein et al. | 252/477 R |
| 4,160,805 | 7/1979 | Inaba et al. | 422/180 |

FOREIGN PATENT DOCUMENTS

| | | | |
|---|---|---|---|
| 51-18263 | 2/1976 | Japan . | |
| 1142800 | 2/1969 | United Kingdom | 252/477 R |

*Primary Examiner*—W. J. Shine
*Attorney, Agent, or Firm*—Flehr, Hohbach, Test, Albritton & Herbert

[57] ABSTRACT

A catalyst system in which the catalytic composition comprises a catalytically active material which is homogeneously interspersed throughout a monolith structure of ceramic composition. The composition is shaped into a unitary monolith which is employed as the catalyst structure. In the method the active material or materials are admixed with a ceramic material, which can be either active or inactive, in finely divided form and then shaped into the monolith structure.

9 Claims, No Drawings

CATALYTIC MONOLITH AND METHOD OF ITS FORMULATION

The invention described herein was made in the course of, or under, a contract with the Environmental Protection Agency.

This invention relates to catalyst systems, compositions and methods for the formulation of such compositions. More particularly, the invention relates to catalyst systems in which the active material is homogeneously interspersed throughout a monolith structure of ceramic composition.

Presently known catalyst systems for use in applications such as combustors employ surface active materials in the form of pure pellets of the active material, or in the form of a surface coating of the active material on substrates such as ceramics. For example, it is well known to apply a catalyst material by slip coating onto a ceramic substrate which is in a honeycomb or other suitable monolith structure. For certain applications, such as gas turbine combustors, monolithic structures are most advantageous.

The disadvantages and limitations of conventional monolithic catalyst systems include the problem of loss of the active material by flaking off or volatilization from the substrate with a resulting loss in catalytic activity, or the problem of a change in the mechanical properties of the structures, due to an interaction of the catalyst coating and the monolith. In certain application, e.g. in combustors for gas turbines, the flaking material can cause erosion and damage to turbine blades, or the weakened catalyst/support can undergo thermostructural failure and enter the turbine, causing damage to the blades.

It is an object of the present invention to provide new and improved catalyst systems and compositions and methods of formulating the compositions.

Another object is to provide a catalyst system of the type described in which the active material is an integral part of the monolith structure to obviate the problems of coating flake-off or volatilization and consequent loss of catalytic activity.

Another object is to provide a catalyst system in which the integrity of the monolith structure is maintained during sustained combustion while obviating the problem of undesirable interaction of a catalyst metal with a substrate which results in structural weakening.

Another object is to provide a catalyst system which provides relatively longer operating life, especially in high temperature applications, and which provides good performance through relatively higher combustion efficiency over a long period of time.

Another object is to provide a catalyst system which achieves relatively good catalytic activity wherein the light-off temperatures of the systems compare favorably to the light-off temperatures of catalyst systems employing noble metals.

The invention in summary comprises a system in which the catalytic composition includes a catalytically active material which is homogeneously interspersed throughout a monolith structure of ceramic composition. The composition is shaped into a unitary monolith which is employed as the catalyst structure. In one version of the method the active material or materials are admixed with a ceramic material, which can be either active or inactive, in finely divided form and then shaped into the monolith structure which is calcined.

The combustion process of the invention comprises combusting reactants in the presence of the monolithic catalytic structures.

The foregoing and additional objects and features of the invention will appear from the following specification in which the several embodiments are set forth.

The catalyst systems of the invention are comprised in general of a catalytically active metal oxide material homogeneously mixed or interspersed in a ceramic metal oxide material. The mixture can be shaped into a unitary monolith of the desired configuration. The resulting monolith is thereby comprised throughout of the catalytically active material to provide a catalysis system with a high degree of structural integrity and with improved performance.

In one embodiment of the invention the active material is a metal oxide which is homogeneously mixed throughout an inactive (or less active) metal oxide, which can be a mixed metal oxide.

Examples of the active metal oxides suitable for use in this embodiment include:
  $NiO$
  $CeO_2$
  $Fe_3O_4$
  $CrO_2$
  $LaCrO_3$
  $Co_2O_3$
  $CoAl_2O_4$ Examples of the inactive (or less active) materials suitable for use in this embodiment include:
  Zirconia Spinel
  Yttria-stabilized zirconia
  $MgAl_2O_4$
  $SrZrO_3$
  $CaZrO_3$ Examples of the catalyst systems formed by the above materials for this embodiment include:
  Zirconia Spinel doped with nickel oxide (5% by weight)
  Yttria-stabilized zirconia doped with nickel oxide (5% by weight)
  Cerium Oxide (80% by weight) with zirconia (20% by weight)
  Cerium Oxide (17% by weight) with zirconia (78% by weight) with nickel oxide dopant (5% by weight)
  $SrCrO_3$ Perovskite doped with $Co_2O_3$ (5% by weight)
  $CaZrO_3$ doped with $Co_2O_3$ (5% by weight)
  $CaZrO_3$ arc-plasma sprayed with $CoAl_2O_4$ doped with $MgAl_2O_4$ (5% by weight)
  $SrZrO_3$ arc-plasma sprayed with $CoAl_2O_4$ doped with $MgAl_2O_4$ (5% by weight)
  $LaCrO_3$ (10% by weight) with $ZrO_2$ (90% by weight)
  $Mg_{.25}Ni_{.75}Cr_2O_4$
  $MgAl_2O_4$: $Fe_3O_4$ In other embodiments of the invention the monolithic catalytic composition is of the perovskite, spinel, corundum or ilmenite crystal structure type in which primary catalytically active metal oxide materials are in intimate admixture with carriers comprising inactive or active metal oxide materials which are capable of forming ceramics. The resulting composition comprises a random interspersion of the various possible crystal structures, e.g. of the perovskites, or the spinels, or the corundum, or the ilmenite, as the case may be.

In one such embodiment a catalytically active base metal oxide of the perovskite crystal structure $ABO_3$ forms a solid solution with another material (either active or inactive) comprising a metal oxide of the perovskite structure $ABO_3$ suitable for formation of a ceramic. Generally the perovskite structure is comprised of cations of different types of metals, one of type A and another of Type B and in which the cations are of different size with the smaller cations in the ccp (cubic close packing) array occupying the octahedral holes formed exclusively by the oxide ions.

The following are examples of the primary active perovskite base metal oxides which can be employed in this embodiment:

$LaCrO_3$
$LaNiO_3$
$LaMnO_3$
$La_{0.5}Sr_{0.5}MnO_3$
$La_{0.8}K_{0.2}Rh_{0.1}Mn_{0.9}O_3$
$ZrXWO_3$ (X=Ni, Co)
$LaCoFeO_3$
$LaMNiO_3$ (M=Ca, or Sr)

The following are examples of perovskite type metal oxides suitable for use as carrier materials in this embodiment:

$LaAlO_3$
$(Sr_{0.4}La_{0.6})(Co_{0.5}V_{0.2})O_3$
$(Sr_{0.2}La_{0.8})CoO_3$
$(Sr_{0.4}La_{0.6})(Co_{0.9}Pt_{0.1})O_3$

The following are examples of catalytically active perovskite metal oxides in solid solution with perovskite metal oxides as carriers:

$LaAlO_3$: $LaCrO_3$ (3:1 mole ratio)
$LaAlO_3$: $LaNiO_3$ (3:1 mole ratio)

Another embodiment of the invention provides a primary catalytically active metal oxide of the spinel crystal structure in solid solution with a spinel structured compound which is suitable for formation of a ceramic. The spinel crystal structure takes the form $A[B_2]O_4$ or the inverse structure $B[AB]O_4$.

The following are examples of the primary active spinel metal oxides which can be employed in this embodiment:

$Fe_3O_4$
$NiAl_2O_4$
$Ni_{0.5}Mg_{0.5}(Al_{0.5}Cr_{0.3}Fe_{0.2})_2O_4$
$Ni(Al_{0.3}Cr_{0.5}Fe_{0.2})_2O_4$ + NiO (1% by weight)
$Co(Al_{0.3}Cr_{0.5}Fe_{0.2})_2O_4$ + CoO (5% by weight)
$MgCr_2O_4$ The following is an example of a spinel type metal oxide suitable for use as the carrier material in this embodiment:

$MgAl_2O_4$

The following are examples of the solid solutions of the catalytically active spinel materials with the carrier spinel materials:

$MgAl_2O_4$: $NiAl_2O_4$ (3:1 mole ratio)
$MgAl_2O_4$: $MgCr_2O_4$ (3:1 mole ratio)
$MgAl_2O_4$: $Fe_3O_4$ (9:1 mole ratio)

Alternatively, an oxide cermet such as the following spinel cermet example can be used:

$MgAl_2O_4$: $Fe_3O_4$: (3:1 mole ratio)+40% Cr by weight

In another embodiment of the invention a primary catalytically active base metal oxide of either the corundum $B_2O_3$ or ilmenite $ABO_3$ crystal structures forms a solid solution with another material (either active or inactive) comprising a metal oxide of the corundum crystal structure suitable for formation of a ceramic.

Examples of the primary active corundum oxides include:

$Fe_2O_3$
$Co_2O_3$ stabilized with Yttria

Examples of the primary active ilmenite oxides employed in this embodiment include:

$Cr_2O_3$
$Fe_xMg_{1-x}TiO_3$ (x between 0.85 and 0.90, for example)

An example of a corundum structured compound suitable for use in this embodiment as the ceramic carrier comprises alumina.

Examples of solid solutions formed between limenite structured active compounds and the corrundum structured carrier comprises $Cr_2O_3$: $Al_2O_3$ (1:5 mole ratio) and $Fe_{.85}Mg_{.15}TiO_3$: $Al_2O_3$ (1:9 mole ratio).

Examples of solid solutions between active compounds and carriers which are both of corundum structure include:

$Al_2O_3$: $Fe_2O_3$ (3:1 mole ratio)
$Al_2O_3$: $Co_2O_3$ (5:1 mole ratio) stabilized with Yttria (29% by weight) From the potentially large number of metal oxide compounds which could formulate into solid solutions of the foregoing type, it will be realized that those compounds containing metals with volatile oxides are generally unsuitable for combustor service. Thus, the many compounds containing barium, lead, rhenium, ruthenium, sodium and other volatile metals are not preferred. Similarly, compounds containing halogens are not considered useful for combustor service and are not preferred in this invention. Additionally, compounds of the type with known melting points below about 1873K are suitable only for lower temperature applications.

One method of formulating the catalyst systems of the invention comprises selection of the starting material in a predetermined proportion according to the mole weight formula of the composition desired for the resulting monolith structure. The starting compounds are pulverized and intermixed, such as by a ball mill or other method, to insure complete dispersion and a small particle size on the order of 10 to 20 microns. The mixture of powder is then formed into the shape which is desired for the particular ceramic technique which is to be used to form the catalyst structure. The mixture is then fired at a temperature of at least 1000° C.

As one example of a method of molding the catalyst structure to a desired shape, e.g. a honeycomb shape, would be to form an aqueous or organic slurry with the reactive powders and a binder, pour the slurry into a mold, apply heat to drive off the water and binder, and then sinter at the high temperature. Another example would be to apply a coating of such a mixture to a substrate such as paper formed into the desired shape and then burn the paper off. Another example for use where one of the starting materials is a pure compound such as alumina would be to press the powders together into the desired shape and then cause them to react.

The following is a specific example of a method of formulating a perovskitebased catalyst system which is a solid solution of $LaAlO_3$ and $LaCrO_3$. Ammonium dichromate $(NH_4)_2Cr_2O_3$ is dissolved in deionized water. Added to that solution is the appropriate mole percentage of $La_2O_3$. Added to that mixture is a reactive alumina in the appropriate mole percentage. The resulting mixture is dried at about 150° C. to form a sludge, then calcined at a temperature above about 600° C. The resulting powder is ball milled and than recalcined above 1300° C. A sample of the recalcined material may be checked by X-ray diffraction. If reaction is not complete, the powder is recalcined until the desired state is achieved.

At this stage the powder which has been made is a completely reacted composition of the base metal oxide. The reacted powder is ball milled with water or other suitable liquid to develope a rheology suited to the chosen forming method, then formed and shaped into the desired unitary configuration.

Another method for making materials suitable for this invention is by gelling solutions of the proper composition of the desired metals. In this case the gel may be spray-dried to provide a powder of the proper rheology for further processing.

After the powder has been brought to the proper rheology, the shaping step may be carried out by formation of a water-based slip (with appropriate organic binders and dispersants) and then casting, extruding, molding or pressing the material into the desired shape. This step may comprise coating of the slip onto a paper, polymer or sponge substrate, after which the substrate can be removed as by firing.

The final step in this method is calcining the resultant monolith material in the range of 1100°–1600° C. It is preferable to calcine in an oxidizing atmosphere. However, with constituents having oxides such as $Cr_2O_3$, which have some volatility, it may be necessary to calcine under an inert atmosphere such as argon. If the material is calcined under a forming gas to reduce the chance of oxide vaporization, a sample of it must be checked by X-ray diffraction to make sure that segregated reduced phases have not been introduced.

The following is a specific example of a method of forming a catalyst system with a corundum-based active ceramic. In the first step appropriate mole percentages of $(NH_4)_2Cr_2O_7$ and $Al_2O_3$ (reactive) are added to deionized water using suitable dispersants. The slurry is dried at 150° C. to a sludge, the sludge is calcined at a temperature of 600° C. and the resulting powder is ball milled. The remaining steps are carried out as set forth in the above example for the perovskite-based system.

The following is a specific example of a method of forming a spinel-based metal oxide catalyst system which is a solid solution of $MgAl_2O_4$ and $NiAl_2O_4$. Basic magnesium carbonate $MgCO_3 \cdot Mg(OH)_2 \cdot 3H_2O$ is dispersed in deionized water, and to that mixture are added suitable quantities of reactive $Al_2O_3$ and $Ni(CO_3)$. The product is then dried at 150° C. to a sludge, and the sludge is calcined at a temperature range of 1000° C.–1300° C. The remaining steps are carried out as in the above-described example for the method of preparing the perovskite-based system.

The following is a specific example of a method of formulating another spinel-based system which is a solid solution of $MgAl_2O_4$ and $MgCr_2O_4$. In the first step $(NH_4)_2Cr_2O_7$ is dispersed in deionized water. To that mixture appropriate quantities of basic magnesium carbonate and reactive $Al_2O_3$ are added as well as a dispersant. The remaining steps are carried out as described in the immediately preceding example.

In the method of forming catalyst systems based upon the above-described general ceramic materials, a common catalytic substrate having several percent (preferably from 1 to 10% but up to 25%) of a catalytically active metal oxide is added to the material before monolith formation. For example, nickel oxide in yttria-stabilized zirconia; nickel oxide or chromium oxide in mullite or cordierite or zircon mullite; $LaCrO_3$ and mullite; $MgCr_2O_4$ and alumina; or nickel oxide or $Co_2O_3$ and alumina. The material is then shaped as described above in connection with the perovskite-based system. Longer times at calcining temperatures may be required to insure that any solid state reaction is complete during formulation.

Another preferred embodiment of the present invention is the use of catalytically-active oxide composition as both the catalytic and the structural materials. Although there are many advantages to be gained by mixing active materials with less-active materials, it is often desirable to use the active oxide composition for the catalytic and structural materials. An example of this is the use of $LaCrO_3$ as the performing catalytically active, electrically-conducting monolith material.

EXAMPLE I

Oxide powders of $MgAl_2O_4$ and $NiAl_2O_4$ (3:1 mole ratio) were prepared by pressing the powders into discs and calcining in the manner described above. The disc size was $2\frac{1}{4}''$ in diameter and $1\frac{3}{4}''$ long with 18 to 30 holes of 0.25" diameter drilled axially to form gas flow passages. The resulting monolith structure was tested in a combustor using air and natural gas reactants under fuel-lean conditions down to a minimum preheat of 325° F. Blowout of the catalyst bed did not occur at the highest throughput attained, 849,000 $hr^{-1}$ space velocity. The catalyst was also tested on lean diesel fuel and sustained combustion to a minimum preheat of 590° F. During the diesel fuel test blowout did not occur during maximum throughput at a space velocity of 1,152,000 $hr^{-1}$.

The results of the text of the first example are listed in Table I. CO emissions were below 50 ppm, and NO emissions ranged from 1 to 30 ppm.

EXAMPLE II

Powders of $LaAlO_3$ and $LaCrO_3$ (3:1 mole ratio) were pressed and calcined into discs shaped as described for Example 1. The catalyst was tested in a combustor using reactants of air and natural gas as well as diesel fuel. The test results are depicted in Table II.

EXAMPLE III

Powders of $MgAl_2O_4$ and $Fe_3O_4$ (3:1 mole ratio) were pressed and calcined into pellets shaped as described in Example I. The catalyst was tested in a combustor on lean natural gas and lean diesel fuel. The test results are set forth in Table III.

EXAMPLE IV

Powders of $MgAl_2O_4$ and $MgCr_2O_4$ (3:1 mole ratio) were pressed and calcined into the shape of tubes 2" in length having nominal dimensions of $\frac{1}{4}''$ OD and $\frac{1}{8}''$ ID. Forty-four of these tubes were bundled and wrapped together in insulation and supported vertically within a holder tube on a disc of Torvex alumina 1" long by 2" diameter which was honeycombed with 3/16" diameter cells. The catalyst structure was tested on air and lean and rich natural gas and diesel fuel. The results of the test are depicted in Table IV. The performance shows that on lean natural gas CO and NO emissions were at or below 18 and 10 ppm respectively. There was no loss in catalytic activity after 5 hours of testing.

EXAMPLE V

Powders of $Al_2O_3$ and $Cr_2O_3$ (9:1 mole ratio) were pressed and calcined into the shape of tubes 2" in length having nominal dimensions of 174" OD and $\frac{1}{8}$" ID. A plurality of the tubes were bundled, wrapped together and supported in the manner described above for example IV. Platinum was added to the front segment to promote light-off. The catalyst structure was tested on air and natural gas. The results of the test are depicted in Table V.

From the foregoing it will be seen that the catalyst system compositions of the present invention provide good performance with high combustion efficiency over a long period of time. The catalytic monolith maintains its structural integrity in operation without loss of catalytic activity through flake-off or volatilization. There is no problem of interaction of base metal catalysts with the substrate, nor is there the problem of degradation of surface area due to growth in crystallite size of the active component when in operation so that there is a relatively longer life, especially in high temperature applications. Additionally, the manufacturing process is relatively less expensive in that there are fewer steps to formulate the monolith structure as compared to existing techniques of manufacturing a substrate, applying a wash coat and then applying the catalyst.

While the foregoing embodiments are at present considered to be preferred, it is understood that numerous variations and modifications may be made therein by those skilled in the art and it is intended to cover in the appended claims all such variations and modifications as fall within the true spirit and scope of the invention.

TABLE I

| Test point | TA (%) | SV (1/hr) | $\dot{m}_{fuel}$ (lbm/hr) | $\dot{m}_{air}$ (lbm/hr) | $T_{ph}$ (°F.) | $T_{bed}$ (°F.) | Velocity (ft/sec) | CO (ppm) | NO (ppm) | UHC (ppm) | Q (Btu/hr) | Test type |
|---|---|---|---|---|---|---|---|---|---|---|---|---|
| 41-6 | 191 | 387,000 | 2.36 | 77.4 | 668 | 2000 | 9.0 | 10 | 4 | 0 | 50,700 | Stabilizing |
| 41-7 | | | | | 618 | 2025 | | | | | | on natural |
| 41-8 | | | | | 613 | 2020 | | | | | | gas |
| 41-9 | | | | | 610 | 2020 | | | | | | |
| 41-10 | | | | | 610 | 2020 | | 13 | | 1 | | |
| 41-11 | | | | | 609 | 2010 | | 10 | | 0 | | |
| 41-12 | | | | | 610 | | | | | | | |
| 41-13 | | | | | 608 | | | | | | | |
| 41-14 | | | | | 607 | | | | 5 | | | |
| 41-15 | | | | | 607 | 2005 | | 8 | | | | |
| 41-16 | | | | | 609 | 2005 | | | | | | |
| 41-17 | 188 | 381,000 | 2.36 | 77.4 | 575 | 2010 | 8.6 | 6 | 5 | 0 | 50,700 | Minimum pre- |
| 41-18 | 186 | 376,000 | | 75.2 | 550 | 2010 | 8.7 | 8 | | | | heat, lean, |
| 41-19 | 183 | 372,000 | | 74.2 | 500 | 2010 | 8.6 | 8 | | | | on natural |
| 41-20 | 181 | 367,000 | | 73.3 | 475 | 2005 | 8.5 | 10 | | | | gas |
| 41-21 | 174 | 353,000 | | 70.4 | 450 | | 8.2 | | 6 | | | |
| 41-22 | 172 | 349,000 | | 69.4 | 425 | | 8.1 | | | | | |
| 41-23 | 169 | 344,000 | | 68.4 | 400 | | 8.0 | 9 | | | | |
| 41-24 | 162 | 330,000 | | 65.5 | 375 | 2015 | 7.7 | 10 | 7 | | | |
| 41-25 | 160 | 326,000 | | 64.5 | 350 | 2005 | 7.5 | | 8 | | | |
| 41-26 | 157 | 321,000 | | 63.6 | 325 | 2005 | 7.4 | | 8 | | | |
| 41-27 | 152 | 312,000 | | 61.6 | 335 | 2015 | 7.2 | | 9 | | | |
| 41-34 | 52 | 219,000 | 4.29 | 38.4 | 523 | 1960 | 5.1 | — | 2 | 6800 | 92,200 | Rich conditions |
| 41-37 | 52 | 219,000 | 4.29 | 38.4 | 658 | 2030 | 5.1 | — | 1 | 3100 | 92,200 | on natural gas, unstable |
| 41-40 | 198 | 399,000 | 2.36 | 80.0 | 801 | 2035 | 9.2 | — | 5 | 0 | 50,700 | Maximum |
| 41-41 | 204 | 495,000 | 2.84 | 99.4 | 793 | 2060 | 11.5 | — | 4 | | 61,100 | throughput, |
| 41-42 | 193 | 545,000 | 3.30 | 109. | 790 | 2070 | 12.6 | 43 | 5 | | 71,000 | natural gas, |
| 41-43 | 212 | 687,000 | 3.81 | 138. | 793 | 2085 | 15.9 | 43 | 3 | | 82,000 | lean |
| 41-44 | 249 | 849,000 | 4.02 | 172. | 789 | 2025 | 19.7 | 40 | 2 | | 86,400 | |
| 41-47 | 173 | 365,000 | 2.89 | 77.1 | 708 | 2090 | 8.5 | 0 | 16 | 0 | 62,100 | Minimum pre- |
| 41-48 | | | | | 692 | 2115 | | 45 | | | | heat, lean, |
| 41-49 | | | | | 663 | 2115 | | 43 | | | | condensed fuel |
| 41-50 | | | | | 642 | 2110 | | 38 | | | | |
| 41-51 | | | | | 626 | 2100 | | 45 | 15 | | | |
| 41-52 | 170 | 356,000 | | 75.2 | 603 | 2075 | 8.2 | 48 | 16 | | | |
| 41-53 | 170 | 356,000 | | 75.2 | 596 | 2025 | 8.2 | 25 | 17 | | | |
| 41-58 | 164 | 356,000 | 2.97 | 75.2 | 876 | 2140 | 8.2 | 44 | 30 | 0.5 | 54,100 | Maximum |
| 41-59 | 171 | 425,000 | 3.41 | 89.7 | 863 | 2200 | 9.8 | — | — | — | 62,200 | throughput, |
| 41-60 | 181 | 562,000 | 4.26 | 119. | 860 | 2100 | 13.0 | 40 | 25 | 0.5 | 77,700 | diesel fuel, |
| 41-61 | 188 | 677,000 | 4.92 | 143. | 872 | 2260 | 15.7 | 40 | 23 | | 89,700 | lean |
| 41-62 | 178 | 723,000 | 5.58 | 153. | 878 | 2325 | 16.7 | — | 33 | | 101,700 | |
| 41-63 | 194 | 883,000 | 6.23 | 186. | 895 | 2350 | 20.5 | 13 | 24 | | 113,600 | |
| 41-64 | 200 | 1,152,000 | 7.87 | 243. | 867 | 2240 | 26.7 | 15 | 18 | | 143,500 | |
| 41-65 | 185 | 1,152,000 | 8.53 | 243. | 860 | 2340 | 26.7 | 30 | 21 | | 155,500 | |

TABLE II

| Test point | TA (%) | SV (1/hr) | $\dot{m}_{fuel}$ (lbm/hr) | $\dot{m}_{air}$ (lbm/hr) | $T_{ph}$ (°F.) | $T_{bed}$ (°F.) | Velocity (ft/sec) | NO (ppm) | UHC (ppm) | Q (Btu/hr) | Test type |
|---|---|---|---|---|---|---|---|---|---|---|---|
| 42-4 | 191 | 460,000 | 2.36 | 77.4 | 630 | 2120 | 10.6 | 3 | 0 | 50,700 | Stabilizing on |
| 42-5 | | | | | 630 | 2110 | | 4 | 1 | | natural gas |
| 42-6 | | | | | 630 | | | 4 | | | |
| 42-7 | | | | | 631 | | | 4 | | | |
| 42-8 | | | | | 631 | | | 5 | | | |
| 42-9 | | | | | 632 | | | 5 | | | |

TABLE II-continued

| Test point | TA (%) | SV (1/hr) | $\dot{m}_{fuel}$ (lbm/hr) | $\dot{m}_{air}$ (lbm/hr) | $T_{ph}$ (°F.) | $T_{bed}$ (°F.) | Velocity (ft/sec) | NO (ppm) | UHC (ppm) | Q (Btu/hr) | Test type |
|---|---|---|---|---|---|---|---|---|---|---|---|
| 42-10 | | | | | 634 | 2120 | | 6 | | | |
| 42-11 | 191 | 460,000 | 2.36 | 77.4 | 570 | 2110 | 10.6 | 6 | 1 | 50,700 | Minimum preheat |
| 42-12 | 183 | 442,000 | | 75.2 | 548 | 2110 | 10.2 | | | | lean, natural |
| 42-13 | 181 | 437,000 | | 73.3 | 525 | 2100 | 10.1 | | | | gas |
| 42-14 | 174 | 421,000 | | 70.4 | 500 | 2100 | 9.7 | | | | |
| 41-15 | 169 | 410,000 | | 68.4 | 450 | 2090 | 9.4 | 7 | | | |
| 42-16 | 162 | 393,000 | | 65.5 | 425 | 2100 | 9.1 | 8 | | | |
| 42-17 | 157 | 382,000 | | 63.6 | 400 | 2110 | 8.9 | 9 | | | |
| 42-18 | 157 | 382,000 | | 63.6 | 377 | 2100 | 8.9 | 8 | | | |
| 42-19 | 52 | 260,000 | 4.29 | 38.4 | 500 | 2120 | 6.0 | 4 | 5300 | 92,200 | Minimum preheat, |
| 42-20 | 56 | 277,000 | | 41.3 | 474 | 2110 | 6.4 | 3 | 2500 | | rich, natural |
| 42-21 | 56 | 277,000 | | 41.3 | 450 | 2100 | 6.4 | 3 | 3000 | | gas |
| 42-22 | 60 | 293,000 | | 44.2 | 390 | 1970 | 6.8 | 6 | 900 | | |
| 42-23 | 63 | 284,000 | | 46.2 | 375 | 2025 | 7.0 | 16 | 400 | | |
| 42-25 | 206 | 589,000 | 1.05 | 99.4 | 690 | 2125 | 13.6 | 7 | 1 | 60,600 | Maximum |
| 42-26 | 210 | 703,000 | 1.23 | 119. | 689 | 2100 | 16.3 | 7 | | 71,000 | throughput, |
| 42-27 | 207 | 789,000 | 1.40 | 133. | 689 | 2160 | 18.3 | 7 | | 80,600 | natural gas, |
| 42-28 | 214 | 874,000 | 1.50 | 148. | 691 | 2160 | 20.2 | 6 | | 86,400 | lean |
| 42-29 | 184 | 425,000 | 2.66 | 75.5 | 790 | 2140 | 9.8 | — | — | 48,500 | Minimum preheat, |
| 42-30 | | | | | 766 | 2140 | | 11 | 4 | | lean, diesel fuel |
| 42-31 | | | | | 725 | 2160 | | 12 | 3 | | |
| 42-32 | | | | | 700 | 2160 | | 13 | | | |
| 42-33 | 182 | 420,000 | | 74.5 | 650 | 2140 | 9.7 | 12 | | | |
| 42-34 | 172 | 398,000 | | 70.6 | 623 | 2150 | 9.2 | 15 | | | |
| 42-35 | 161 | 371,000 | | 65.8 | 600 | 1770 | 8.6 | 20 | 2 | | |
| 42-37 | 196 | 753,000 | 4.43 | 133.5 | 750 | 2240 | 17.4 | 12 | 18 | 80,800 | Maximum through- |
| 42-38 | 189 | 944,000 | 5.74 | 167. | 772 | 2140 | 21.8 | 18 | 17 | 10,500 | put, diesel fuel, |
| 42-39 | 191 | 1,124,000 | 6.76 | 199. | 792 | 1650 | 26.0 | 16 | 15 | 123,000 | lean |

TABLE III

| Test point | TA (%) | SV (1/hr) | $\dot{m}_{fuel}$ (lbm/hr) | $\dot{m}_{air}$ (lbm/hr) | $T_{ph}$ (°F.) | $T_{bed}$ (°F.) | Velocity (ft/sec) | CO (ppm) | NO (ppm) | UHC (ppm) | Q (Btu/hr) | Test Type |
|---|---|---|---|---|---|---|---|---|---|---|---|---|
| 45-2 | 191 | 395,000 | 2.36 | 77.4 | 730 | 2260 | 11.4 | — | 4 | 0 | 50,700 | Stabilizing on |
| 45-3 | | | | | | | | — | 5 | 3 | | natural gas |
| 45-4 | | | | | | | | — | 5 | 0 | | |
| 45-5 | | | | | | | | — | 5 | | | |
| 45-6 | | | | | | | | — | 4 | | | |
| 45-7 | | | | | | | | — | 5 | | | |
| 45-11 | 191 | 395,000 | 2.36 | 77.4 | 778 | 2280 | 11.4 | 25 | 6 | 0 | 50,700 | Minimum pre- |
| 45-12 | | | | | 774 | 2280 | | 20 | 5 | | | heat, lean, |
| 45-13 | | | | | 700 | 2250 | | 20 | 4 | | | natural gas |
| 45-14 | | | | | 675 | 2240 | | 25 | 4 | | | |
| 45-15 | 179 | 371,000 | | 72.6 | 625 | 2250 | 10.8 | 0 | 6 | 2 | | |
| 45-16 | 179 | 371,000 | | 72.6 | 600 | | 10.8 | | 5 | | | |
| 45-17 | 175 | 362,000 | | 70.6 | 575 | | 10.5 | | 6 | | | |
| 45-18 | 172 | 357,000 | | 69.7 | 550 | | 10.3 | | | | | |
| 45-19 | 170 | 353,000 | | 68.7 | 525 | 2240 | 10.2 | | | | | |
| 45-20 | 167 | 348,000 | | 67.7 | 500 | 2240 | 10.1 | | | | | |
| 45-26 | 191 | 395,000 | 2.36 | 77.4 | 860 | 2200 | 11.4 | 0 | 7 | 0 | 50,700 | Maximum |
| 45-27 | 211 | 604,000 | 3.30 | 119. | 824 | 2240 | 17.5 | | 5 | | 71,000 | throughput, |
| 45-28 | 214 | 702,000 | 3.78 | 138. | 817 | 2250 | 20.3 | | 4 | | 81,300 | natural gas |
| 45-29 | 213 | 751,000 | 4.05 | 148. | 806 | 2250 | 21.8 | | 4 | | 87,100 | |
| 45-30 | 187 | 388,000 | 2.79 | 80.3 | 794 | 2310 | 11.2 | — | 15 | 0 | 50,900 | Minimum pre- |
| 45-31 | 182 | 379,000 | | 78.4 | 750 | 2300 | 11.0 | — | 14 | | | heat, lean, |
| 45-32 | 182 | 379,000 | | 78.4 | 700 | 2320 | 11.0 | — | 15 | | | diesel |
| 45-33 | 182 | 379,000 | | 78.4 | 650 | 2300 | 11.0 | — | | | | |
| 45-34 | 180 | 374,000 | | 77.4 | 625 | | 10.8 | — | | | | |
| 45-35 | 176 | 365,000 | | 75.5 | 600 | | 10.6 | — | | | | |
| 45-36 | 171 | 355,000 | | 73.5 | 575 | | 10.3 | — | 17 | | | |
| 45-37 | 167 | 346,000 | | 71.6 | 550 | | 10.0 | — | 17 | | | |
| 45-38 | 162 | 337,000 | | 69.7 | 525 | | 9.8 | — | 18 | | | |
| 45-39 | 158 | 327,000 | | 67.7 | 490 | 2320 | 9.5 | — | 21 | | | |
| 45-40 | 153 | 318,000 | | 65.8 | 475 | 2350 | 9.2 | — | 23 | | | |
| 45-41 | 153 | 318,000 | | 65.8 | 450 | 2300 | 9.2 | — | 22 | | | |
| 45-42 | 149 | 309,000 | | 63.9 | 425 | 2340 | 8.9 | — | 23 | | | |
| 45-43 | 144 | 299,000 | | 61.9 | 395 | 2340 | 8.7 | — | 28 | | | |
| 45-44 | 142 | 295,000 | | 61.0 | 375 | 2340 | 8.5 | — | 28 | | | |
| 45-45 | 142 | 295,000 | | 61.0 | 348 | 2340 | 8.5 | — | 28 | | | |
| 45-46 | 140 | 290,000 | | 60.0 | 325 | 2300 | 8.4 | — | 26 | | | |
| 45-47 | 137 | 285,000 | | 59.0 | 300 | 2270 | 8.3 | — | 23 | | | |
| 45-48 | 122 | 253,000 | | 52.3 | 275 | 2250 | 7.3 | — | 26 | | | |
| 45-49 | 117 | 243,000 | | 50.3 | 255 | 2150 | 7.0 | — | 20 | | | |
| 45-52 | 182 | 374,000 | 2.89 | 77.4 | 794 | 2280 | 10.8 | — | 11 | 2 | 527,000 | Maximum |
| 45-53 | 203 | 669,000 | 4.42 | 138. | 781 | 2350 | 19.4 | — | 8 | 3 | 806,000 | throughput, |
| 45-54 | 194 | 814,000 | 5.64 | 168. | 794 | 2300 | 23.6 | — | 15 | 2 | 103,000 | diesel fuel |
| 45-55 | 174 | 879,000 | 6.79 | 182. | 793 | 2000 | 25.5 | — | 30 | — | 124,000 | |
| 45-56 | 140 | 290,000 | 2.79 | 60.0 | 351 | 2170 | 8.4 | — | 28 | 3 | 50,900 | Minimum pre- |

TABLE III-continued

| Test point | TA (%) | SV (1/hr) | $\dot{m}_{fuel}$ (lbm/hr) | $\dot{m}_{air}$ (lbm/hr) | $T_{ph}$ (°F.) | $T_{bed}$ (°F.) | Velocity (ft/sec) | CO (ppm) | NO (ppm) | UHC (ppm) | Q (Btu/hr) | Test Type |
|---|---|---|---|---|---|---|---|---|---|---|---|---|
| 45-57 | 119 | 435,000 | 4.92 | 90.0 | 321 | 2250 | 12.6 | — | — | — | 89,700 | heat, lean, |
| 45-58 | 119 | 435,000 | 4.92 | 90.0 | 304 | 2220 | 12.6 | — | — | — | 89,700 | diesel at higher throughput |

TABLE IV

| Test point | TA (%) | SV (1/hr) | $\dot{m}_{fuel}$ (lbm/hr) | $\dot{m}_{air}$ (lbm/hr) | $T_{ph}$ (°F.) | $T_{bed}$ (°F.) | Velocity (ft/sec) | CO (ppm) | NO (ppm) | HC (ppm) | Q (Btu/hr) | Test type |
|---|---|---|---|---|---|---|---|---|---|---|---|---|
| 46-2 | 222 | 321,000 | 2.36 | 90.0 | 724 | 2450 | 14.9 | 8 | 4 | 0 | 50,700 | Minimum preheat |
| 46-3 | 222 | 321,000 | | 90.0 | 699 | 2450 | 14.9 | 10 | 5 | | | lean, natural |
| 46-4 | 218 | 315,000 | | 88.1 | 640 | 2450 | 14.6 | 10 | 7 | | | gas |
| 46-5 | 203 | 295,000 | | 82.3 | 611 | 2400 | 13.7 | 13 | | | | |
| 46-6 | 199 | 288,000 | | 80.3 | 575 | 2425 | 13.4 | 13 | | | | |
| 46-7 | 196 | 285,000 | | 79.4 | 550 | 2350 | 13.2 | 15 | | | | |
| 46-8 | 191 | 279,000 | | 77.4 | 525 | — | 12.9 | — | — | | | |
| 46-9 | 187 | 272,000 | | 75.5 | 500 | 2480 | 12.6 | 15 | 8 | | | |
| 46-10 | 182 | 265,000 | | 73.5 | 475 | 2550 | 12.3 | | | | | |
| 46-11 | | | | | 450 | 2620 | | | | | | |
| 46-12 | | | | | 425 | 2600 | | | | | | |
| 46-13 | | | | | 400 | 2550 | | 13 | | | | |
| 46-14 | 179 | 262,000 | | 72.6 | 375 | 2500 | 12.1 | — | | | | |
| 46-15 | 179 | 262,000 | | 72.6 | 350 | 2550 | 12.1 | 15 | | | | |
| 46-16 | 179 | 262,000 | | 72.6 | 325 | 2525 | 12.1 | 10 | | | | |
| 46-17 | 175 | 255,000 | | 70.6 | 300 | 2525 | 11.8 | 15 | | | | |
| 46-18 | 175 | 255,000 | | 70.6 | 275 | 2500 | 11.8 | | | | | |
| 46-19 | 175 | 255,000 | | 70.6 | 250 | 2500 | 11.8 | | | | | |
| 46-20 | 170 | 249,000 | | 68.7 | 178* | 2450 | 11.5 | | | | | |
| 46-23 | 50 | 152,000 | 4.29 | 36.8 | 674 | 2620 | 7.0 | — | 6 | 6000 | 92,000 | Unstable on natural gas, rich |
| 46-25 | 234 | 338,000 | 2.36 | 94.8 | 824 | 2450 | 15.7 | 18 | 10 | 0 | 50,700 | Maximum throughput, lean, natural gas |
| 46-26 | 227 | 390,000 | 2.82 | 109. | 780 | 2450 | 18.1 | 15 | 8 | | 60,600 | |
| 46-27 | 212 | 426,000 | 3.27 | 119. | 780 | 2480 | 19.7 | 13 | | | 70,300 | |
| 46-28 | 208 | 479,000 | 3.75 | 134. | 789 | 2525 | 22.2 | 15 | | | 80,600 | |
| 46-29 | 213 | 530,000 | 4.05 | 148. | 788 | 2500 | 24.5 | 10 | | | 87,100 | |
| 46-32 | 207 | 307,000 | 2.82 | 90.0 | 780 | 2550 | 14.2 | 20 | 7 | 0 | 60,600 | Unstable on |
| 46-33 | 207 | 307,000 | 2.82 | 90.0 | 804 | 2500 | 14.2 | 10 | 8 | 1 | 60,600 | diesel fuel |
| 46-35 | 175 | 472,000 | 5.12 | 138. | 850 | — | 21.9 | 10 | 9 | 10 | 112,600 | |
| 46-37 | 191 | 279,000 | 2.36 | 77.4 | 525 | 2450 | 12.9 | 5 | 5 | 0 | 50,700 | Still catalytically active on natural gas |
| 46-38 | 191 | 279,000 | 2.36 | 77.4 | 497 | 2450 | 12.9 | 5 | 5 | — | 50,700 | |

*Ambient

TABLE V

| Test Point | TA (%) | SV (1/hr) | $\dot{m}_{CH4}$ (lbm/hr) | $\dot{m}_{air}$ (lbm/hr) | $T_{ph}$ (°F.) | $T_{bed}$ (°F.) TR1 | $T_{bed}$ (°F.) TR2 | CO (ppm) | NO (ppm) | HC (ppm) | Test Type |
|---|---|---|---|---|---|---|---|---|---|---|---|
| 32-10 | 180 | 116,000 | 2.44 | 75.7 | 683 | 2520 | 800 | 20 | 30 | 8 | Aging (bed nonuniform) |
| 32-12 | 197 | 116,000 | 2.23 | | 685 | 2600 | 1560 | 16 | 28 | 12 | |
| 32-14 | 207 | 115,000 | 2.12 | | 688 | 2575 | 1775 | 18 | 22 | 9 | |
| 32-15 | | | | | 689 | 2575 | 1840 | 20 | 23 | — | |
| 32-16 | | | | | 688 | 2560 | 1850 | 20 | 21 | — | |
| 32-17 | | | | | 689 | 2575 | 1910 | 25 | 21 | — | |
| 32-18 | 213 | | 2.06 | | 690 | 2600 | 2125 | 19 | 22 | — | |
| 32-20 | 205 | 111,000 | | 72.7 | 689 | 2590 | 2100 | 16 | 20 | — | |
| 32-21 | | | | | 690 | 2570 | 1900 | 16 | 19 | — | |
| 32-23 | | | | | | 2560 | 1810 | 20 | 15 | — | |
| 32-24 | | | | | | | 1890 | 21 | 15 | — | |
| 32-25 | | | | | | | 1950 | 19 | 20 | 1 | |
| 32-26 | | | | | 691 | 2580 | 2100 | 21 | 20 | 1 | |
| 32-27 | | | | | | | 2100 | 22 | 18 | 2 | |
| 32-28 | | | | | | | 2110 | 23 | 18 | 2 | |
| 32-29 | | | | | | 2575 | 1200 | 21 | 16 | 2 | |
| 32-30 | | | | | | 2575 | 1690 | 20 | 16 | 2 | |
| 32-31 | | | | | 690 | 2580 | 1750 | 20 | 14 | 2 | |
| 32-32 | | | | | 690 | | 1740 | 20 | 14 | 1 | |
| 32-33 | | | | | 691 | | 1710 | 21 | 14 | 1 | |
| 32-34 | | | | | | | 1740 | 20 | 14 | 1 | |
| 32-35 | | | | | | | 1810 | 21 | 14 | 0 | |
| 32-36 | | | | | 690 | 2525 | 1640 | 20 | 13 | 0 | |
| 32-41 | 245 | 123,000 | 1.93 | 81.5 | 778 | 2575 | 2560 | 4 | 3 | 1 | Minimum preheat, lean |
| 32-42 | 242 | 123,000 | 1.96 | | 761 | 2560 | 2550 | 5 | 3 | 0 | |
| 32-43 | 235 | 124,000 | 2.01 | | 745 | 2580 | 2560 | 5 | 3 | 0 | |
| 32-45 | 235 | | 2.01 | | 725 | 2550 | 2525 | 5 | 3 | 0 | |
| 32-47 | 218 | | 2.17 | | 698 | 2575 | 2550 | 5 | 4 | 0 | |
| 32-48 | 205 | | 2.31 | | 675 | 2600 | 2580 | 5 | 5 | 3 | |
| 32-49 | 205 | | 2.31 | | 646 | 2580 | 2560 | 5 | 4 | 2 | |

TABLE V-continued

| Test Point | TA (%) | SV (1/hr) | $\dot{m}_{CH_4}$ (lbm/hr) | $\dot{m}_{air}$ (lbm/hr) | $T_{ph}$ (°F.) | $T_{bed}$ (°F.) TR1 | TR2 | CO (ppm) | NO (ppm) | HC (ppm) | Test Type |
|---|---|---|---|---|---|---|---|---|---|---|---|
| 32-50 | 201 | 125,000 | 2.36 |  | 623 | 2590 | 2570 | 5 | 5 | 2 |  |
| 32-51 | 196 | 125,000 | 2.41 |  | 599 | 2575 | 2550 | 5 | 4 | 3 |  |
| 32-52 | 193 | 123,000 | 2.41 | 80.1 | 574 | 2570 | 2550 | 5 | 4 | 2 |  |
| 32-54 | 190 | 126,000 | 2.52 | 82.5 | 582 | 2600 | 2590 | 5 | 5 | 1 |  |
| 32-56 | 188 | 143,000 | 2.87 | 93.2 | 550 | 2600 | 2590 | 5 | 5 | 2 |  |
| 32-57 | 160 | 126,000 | 2.95 | 81.5 | 500 | 2575 | 2550 | 6 | 4 | 0 |  |
| 32-58 | 176 | 137,000 |  | 89.3 | 440 | 2560 |  | 6 | 4 | 0 |  |
| 32-59 | 176 | 137,000 |  | 89.3 | 400 | 2570 |  | 6 | 4 | 0 |  |
| 32-61 | 179 | 121,000 | 2.55 | 78.6 | 750* | 2500 | 2490 | 6 | 4 | 0 |  |
| 32-62 | 173 | 107,000 | 2.33 | 69.4 | 762* | 2500 | 2490 | 6 | 4 | 0 |  |
| 32-65 | 210 | 154,000 | 2.79 | 101 | 645 | 2600 | 2575 | 5 | 4 | 0 | Maximum throughput |
| 32-66 | 217 | 219,000 | 3.82 | 144 | 649 |  | — | 6 | 4 | 0 |  |
| 32-67 | 216 | 229,000 | 4.05 | 150 | 656 |  | — | 6 | 4 | 0 |  |
| 32-68 | 218 | 232,000 | 4.05 | 152 | 646 |  | 2560 | 6 | 4 | 0 |  |

What is claimed is:

1. A monolithic catalytic structure formed by the steps of homogeneously interspersing throughout a carrier structure of ceramic composition a base metal oxide which upon calcination becomes catalytically active, forming the ceramic composition interspersed with the oxide into the shape of a monolithic structure, and calcining the shaped structure with the interspersed metal oxide at a temperature of at least about 1,000° C.

2. A catalytic structure as in claim 1 in which the metal of the active base metal oxide is selected from the group consisting of Ni, Ce, Cr, Zr, Fe, Co and La.

3. A catalytic structure as in claim 1 comprising an additional catalytically active base metal oxide homogeneously interspersed throughout the carrier structure.

4. A monolithic catalytic structure comprising a catalytically active base metal oxide homogeneously interspersed throughout a carrier structure of ceramic composition, with the metal of the active base metal oxide selected from the group consisting of Ni, Ce, Cr, Zr, Fe, Co and La, and the ceramic of the carrier is selected from the group consisting of a mixed metal oxide of spinel crystal structure or a mixed metal oxide of corundum crystal structure.

5. A method of formulating a catalyst system comprising the steps of preparing a base metal oxide which upon calcination becomes catalytically active, said metal oxide having an average particle size on the order of 10–20 microns, interspersing the oxide particles throughout particles of a carrier structure of ceramic composition, forming the ceramic composition interspersed with the oxide into the shape of a monolith structure, and calcining the shaped structure at a temperature of at least 1,000° C. to form an homogeneous interspersion of the metal oxide in the ceramic.

6. A combustion process comprising combusting reactants in the presence of a monolithic catalytic structure comprising a catalytically active base metal oxide homogeneously interspersed throughout a carrier structure of structurally sound ceramic composition.

7. A combustion process as in claim 6 in which the metal of the active base metal oxide is selected from the group consisting of Ni, Ce, Cr, Zr, Fe, Co and La.

8. A combustion process as in claim 6 comprising an additional catalytically active base metal oxide homogeneously interspersed throughout the carrier structure.

9. A combustion process comprising combusting reactants in the presence of a monolithic catalytic structure comprising a catalytically active base metal oxide homogeneously interspersed throughout a carrier structure of ceramic composition, in which the metal of the active base metal oxide is selected from the group consisting of Ni, Ce, Cr, Zr, Fe, Co and La, and the ceramic of the carrier is selected from the group consisting of a mixed metal oxide of spinel crystal structure and a mixed metal oxide of corundum crystal structure.

* * * * *